INVENTOR.
SYLVESTER R. CUDNOHUFSKY
BY
Barnes, Kisselle, Raisch & Choate
ATTORNEYS

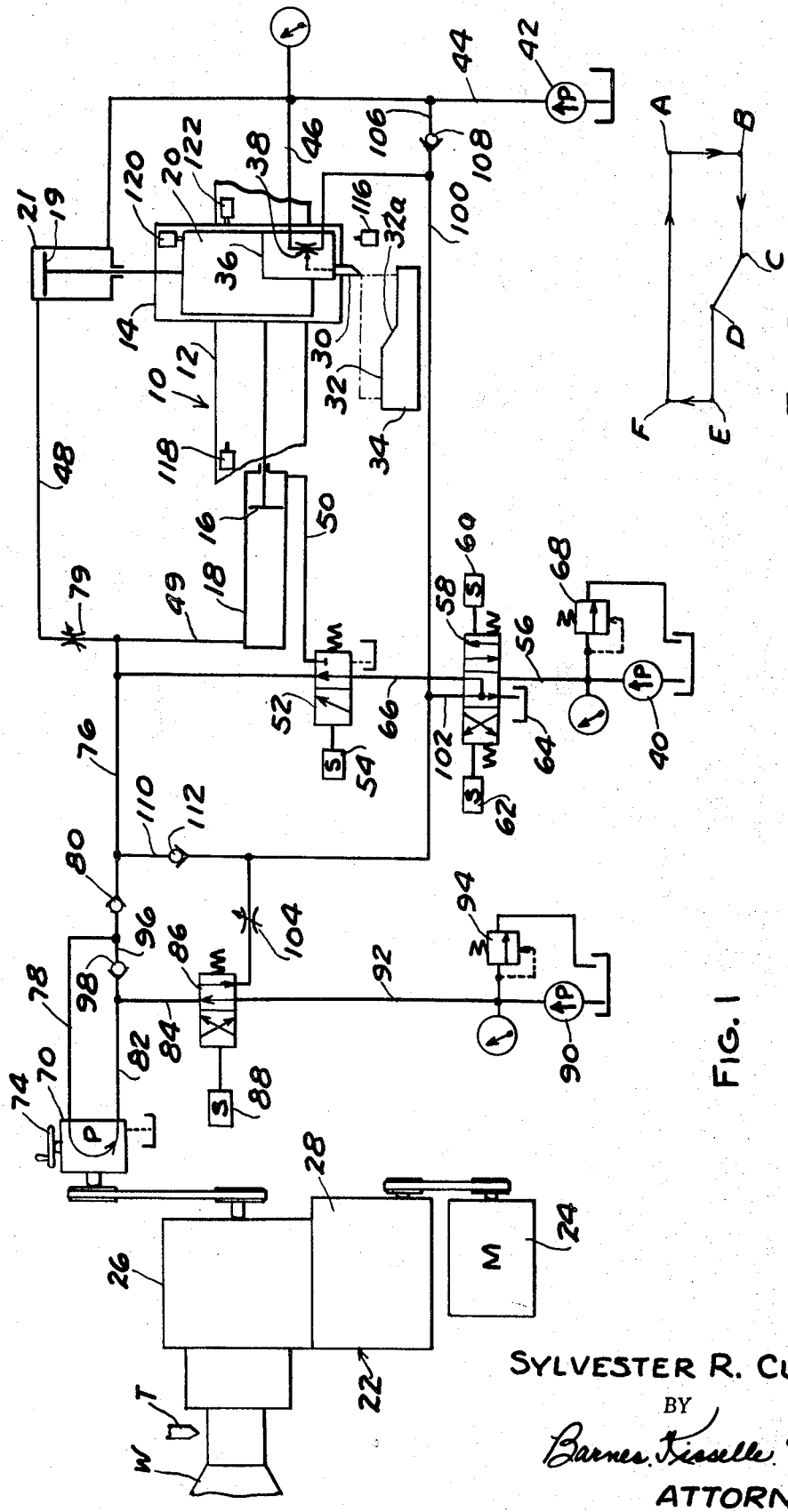

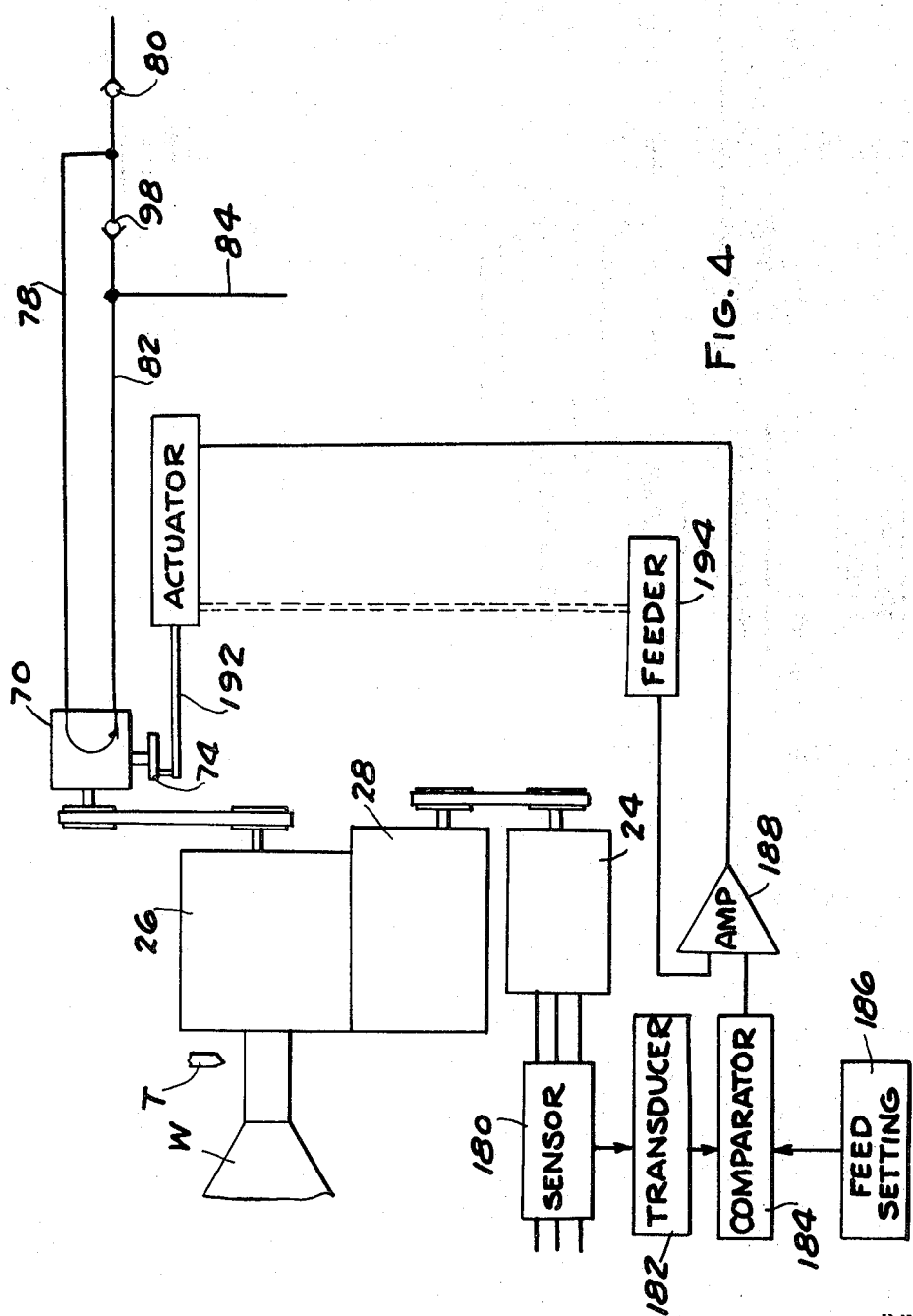

United States Patent Office 3,543,615
Patented Dec. 1, 1970

3,543,615
TRACER CONTROL CIRCUIT FOR A LATHE OR THE LIKE
Sylvester R. Cudnohufsky, 1290 Lake Angelus Shore Drive, Pontiac, Mich. 48055
Filed Aug. 8, 1968, Ser. No. 751,285
Int. Cl. B23b 3/28
U.S. Cl. 82—14                                         16 Claims

ABSTRACT OF THE DISCLOSURE

A hydraulic tracer control circuit for a lathe wherein the feed of the cutting tool per revolution of the workpiece is controlled or maintained constant by directing the oil disharged from the main and/or cross slide cylinders during the feed cycle of the tool through an adjustable, positive displacement pump driven at a speed proportional to the speed of the work-supporting spindle of the lathe.

---

This invention relates to a tracer control circuit for a lathe or the like.

In a conventional tracer control circuit for a lathe it is not uncommon to control the feed rate of the cutting tool by directing the hydraulic fluid discharged from the main and cross slide cylinders during the feed cycle through a conventional flow control valve so that the rate of the travel of the cutting tool is determined by the rate at which oil is discharged through the flow control valve. With such an arrangement if it is desired to maintain the feed rate in inches per revolution constant regardless of a change in the speed of the lathe spindle, it is necessary to change the setting of the flow control valve or to utilize additional flow control valves when the speed of the machine spindle is varied. For example, if in a particular machining operation the workpiece is rotated at 2,000 r.p.m. while the tool is cutting in an axial direction and is rotated at a speed of 500 r.p.m. while the tool is cutting in a radial direction, if a single flow control valve is utilized during the entire feed cycle and the setting of this valve is not changed, the feed of the tool per revolution of the workpiece will vary substantially between the axial and radial cuts. However, it is frequently desired to maintain the feed of the cutting tool constant per revolution of the workpiece regardless of whether the cut being made is axial, radial or at an acute angle to the axis of rotation of the work. When several flow control valves are utilized and successively switched into the circuit, they render the circuit substantially more complex, may slow down the cycle and may cause tool marks on the work.

It is an object of the present invention to provide a tracer control circuit for a lathe or the like wherein the travel of the cutting tool in inches per revolution may be a preselected value regardless of variations in the speed of rotation of the work.

Another object of the invention is to provide a tracer control circuit for a lathe or the like wherein the feed of the tool can be controlled in relation to a change in a variable operating condition such as torque on the spindle, temperature of the tool, diameter of the work, etc. to produce a cutting cycle conducive to high efficiency, maximum tool life and high quality of machined parts.

A further object of the present invention is to provide a tracer control circuit of the type described wherein the rate at which hydraulic fluid is discharged from the main and/or cross slide cylinders of the machine tool during the feed cycle is metered at a rate proportional to the speed of rotation of the work-supporting spindle so that the distance traveled by the cutting tool per revolution of the workpiece remains constant during the cutting cycle of the tool.

More specifically the present invention contemplates a tracer control circuit for a lathe or the like wherein the hydraulic fluid discharged from the main and/or cross slide cylinders is directed through a positive displacement pump which is driven at a speed the same as or proportional to the speed of rotation of the work-supporting spindle so that at any particular setting of the pump it meters or feeds a fixed quantity of hydraulic fluid from the main and/or cross slide cylinders during each revolution of the workpiece. When it is desired to change the feed rate to compensate for a change in a variable operating condition, means are provided for automatically changing the setting of the feed or metering pump in response to a change in the operating condition.

Other features and objects of the present invention will become apparent from the accompanying description and drawing in which:

FIG. 1 is a diagrammatic view of one form of a tracer control circuit embodying the present invention, the various valves being shown in the positions they assume when the circuit is energized and running idly.

FIG. 2 is a diagrammatic view showing the path of travel of the tracer stylus and cutting tool in the arrangement illustrated in FIG. 1.

FIG. 4 is a diagrammatic view showing one arrangement for adjusting the displacement of the feed or metering pump in response to a change in a variable operating condition in the system.

Figure 3:
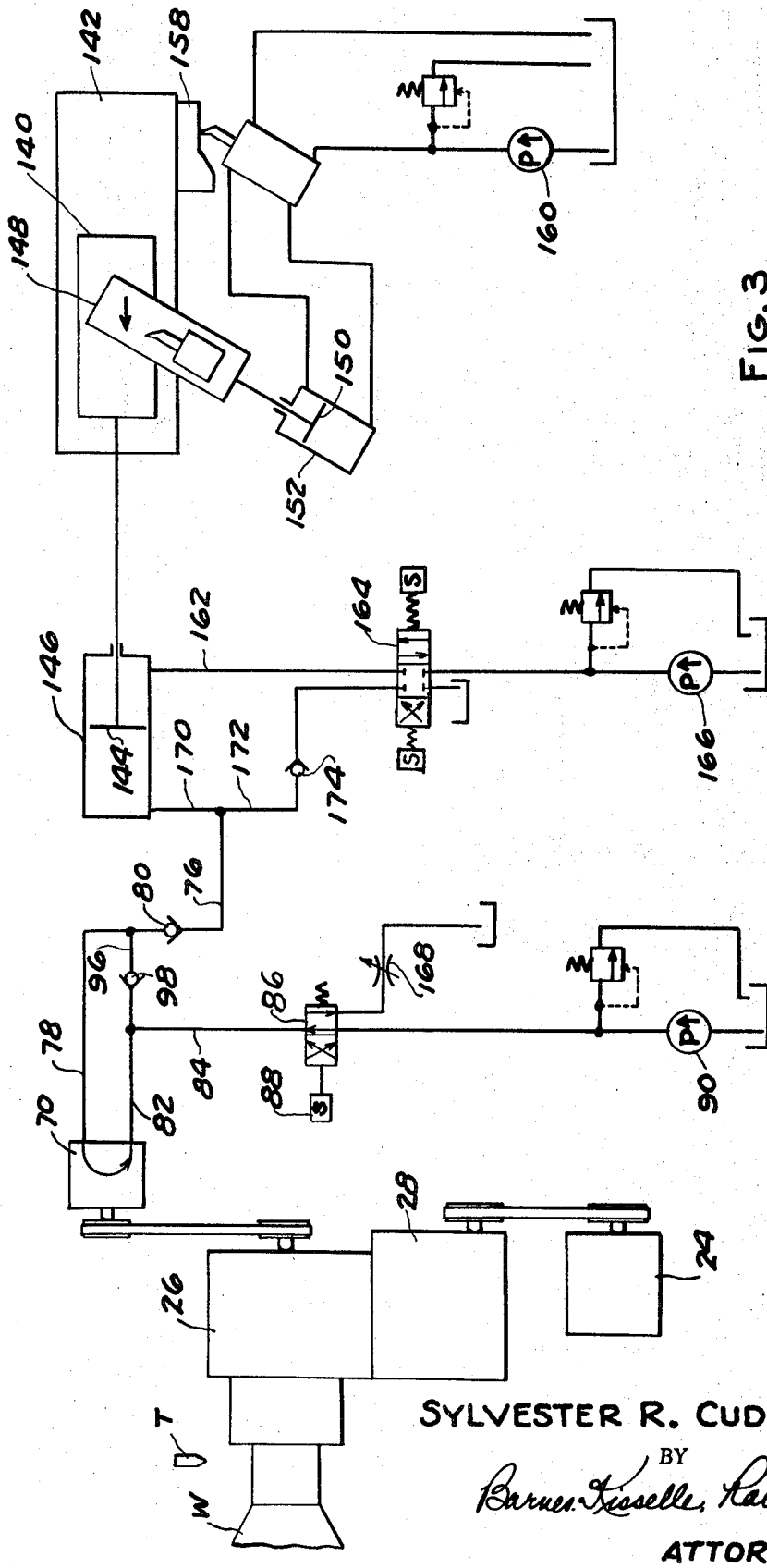
FIG. 3 is a diagrammatic view of another tracer control circuit embodying the present invention.

In FIG. 1 a machine tool is generally designated at 10 having a bed 12 on which a main slide 14 is adapted to be shifted longitudinally by the piston 16 of a hydraulic cylinder 18. A cross slide 20 is mounted on slide 14 for movement in a direction perpendicular to the direction of travel of slide 14 and is actuated by the piston 19 of a hydraulic cylinder 21.

For the purpose of illustration the headstock of the machine is generally designated 22 and includes a motor 24 which drives a work-supporting spindle 26 through a gear train 28. The workpiece to be machined is designated W. The cutting tool T is mounted on cross slide 20 and during the feed cycle its path of travel is controlled by a stylus 30 which is adapted to trace a path corresponding to the contoured surface 32 of a fixedly supported template 34. For the purposes of illustration tool T is shown located adjacent the headstock 22 rather than on cross slide 20. Stylus 30 forms part of a tracer valve 36 which is also supported on cross slide 20. Tool T and stylus 30 travel parallel paths. Tracer valve 36 is of the type disclosed in my prior Pat. 2,940,263 and need not be described in detail. For the purposes of this description it will suffice to state that valve 36 has an orifice 38 therein the restriction of which varies in accordance with the deflection of stylus 30. Stylus 30 is deflected in response to engagement with the contoured surface 32 of template 34.

The source of pressurized hydraulic fluid for operating cylinders 18 and 21 comprises two pumps 40, 42. Pump 40 may be referred to as a low pressure pump which is capable of developing a relatively low, substantially constant pressure (for example, 4 gallons per minute at 400 lbs. per square inch). Pump 42 may be referred to as a high pressure pump which is capable of instantaneously developing a relatively high pressure. For example, pump 42 is capable of delivering about 6 gallons per minute at a pressure of say 600 lbs. per square inch. The output of pump 42 has a pressure line 44 extending therefrom which is connected to the rod end of cylinder 21 and is also connected as by a branch conduit 46 with the inlet of tracer valve 36. The head end of cylinder 21 is connected by a conduit 48 to flow control valve 79 and thence via conduit 49 with the head end of cylinder 18. The rod end of cylinder 18 is connected by a conduit 50 with one port of a two-position, four-way valve 52 controlled by a solenoid 54.

Pump 40 has its outlet connected by a pressure line 56 with one port of a spring-centered, three-position, four-way solenoid valve 58. The two solenoids for controlling valve 58 are designated 60 and 62. Another port of valve 58 is connected to sump as at 64. A third port on valve 58 is connected by a conduit 66 with an inlet port on valve 52. A conventional relief valve 68 is connected with pressure line 56 to limit the maximum pressure developed by pump 40.

A pump 70 is driven by the machine tool spindle 26 through a belt 72 or other suitable means. Pump 70 is of the positive displacement type, preferably an axial piston type pump the displacement of which is variable by means of a control 74 in the form of a hand wheel or other suitable adjustment mechanism. Conduit 49 which completes the interconnection of the head end of cylinder 21 which the head end of cylinder 18 is connected to the inlet of pump 70 by conduits 76, 78. A check valve 80 in conduit 76 permits flow of oil from cylinders 18 and 21 to pump 70 but prevents the flow of oil in the opposite direction. The outlet of pump 70 is connected by conduits 82, 84 with port A of a two-position, four-way solenoid valve 86 whose B port is plugged. The solenoid which controls valve 86 is designated 88. A second high pressure pump 90 is connected to port P of valve 86 by a conduit 92. Pump 90 is capable of delivering oil at a rate of say 2 gallons per minute at a pressure of 700 lbs. per square inch. Relief valve 94 is provided for limiting the maximum pressure developed by pump 90. The inlet and outlet conduits 78 and 82 of pump 70 are interconnected by a conduit 96 in which there is arranged a check valve 98 for preventing flow of oil from conduit 78 to outlet conduit 82.

A conduit 100 extends from the drain port of tracer valve 36 to the drain port S of valve 86. This conduit is connected with one port of valve 58 by a conduit 102. An adjustable flow control valve 104 controls the rate of discharge of oil from valve 86 to sump 64. Conduit 100 is connected with pressure line 44 from pump 42 by a conduit 106 controlled by a check valve 108 which prevents the flow of oil in the direction from pressure line 44 to conduit 100. Likewise, conduit 100 is connected with conduit 76 by a conduit 110 controlled by a check valve 112 which prevents flow of fluid in the direction from line 76 to conduit 100.

In FIG. 1 the various valves are illustrated in the position they assume in the idle condition of the circuit with the various pumps and motor 24 operating. The pressure in line 44 from pump 42 is at a relatively low value since the restriction at orifice 38 in tracer valve 36 is at a minimum. This pressure is sufficient to maintain the cross slide 20 and the main slide 14 in the retracted positions illustrated (point A on FIG. 2) so that stylus 30 is retracted from the template and tool T is retracted from work W. At the same time oil under pressure supplied by pump 90 is admitted to both the inlet port of pump 70 (through lines 92, 84, 96 and 78) and the discharge port of pump 70 (through line 82). Since it is assumed that the spindle 26 of the machine is rotating, pump 70 is being driven and, thus, the high pressure oil merely recirculates through lines 78, 82 and 96 and maintains check valve 80 in the seated position. With check valve 80 firmly closed by a pressure source higher than any other available in the system no oil can leave cylinders 18 and 21, so that they are held rigidly fixed in position, stopping tool feed.

In order to cause the stylus to approach the template, solenoid 60 is energized to shift the spool of valve 58 to the left. When this occurs, oil under pressure from pump 40 flows through conduits 56, 66, 114 and 48 to the head end of cylinder 21. The pressure developed by pump 40 is sufficient at this time to overcome the pressure in line 44 and thus cause cross slide 20 and tool T to approach the work. Stylus 30 approaches template 34 in the direction from point A toward point B in FIG. 2. When stylus 30 engages template 34 (point B in FIG. 2), the increased restriction at orifice 38 causes the pressure in line 44 to rise immediately to a value sufficient to arrest movement of cross slide 20.

When stylus 30 contacts surface 32 of template 34 the cross slide engages a switch 116 which energizes solenoids 54 and 88. When solenoids 54 is energized oil under pressure from pump 40 is directed through conduit 50 to the rod end of cylinder 18. This causes piston 16 to move to the left and advance slide 14 in the feed direction. At this time stylus 30 is traversing the line interconnecting points B and C in FIG. 2. As piston 16 moves to the left in cylinder 18 oil is discharged from the head end of the cylinder and is directed through lines 76 and 78 to the inlet of pump 70. Since solenoid 88 is now energized, the pressure source from pump 90 is no longer available, being blocked by valve 86 so that check valve 80 is free to pass oil from line 76 to pump 70. This oil is metered by pump 70 through lines 82, 84, valve 86, flow control valve 104 and line 100 to sump 64. Since pump 70 meters a fixed amount of oil from cylinder 18 during each revolution of spindle 26, it follows that the rate of travel of the tool is constant for each revolution of the work. The feed rate desired is initially selected by adjusting the manual control 74. Control 74 is preferably calibrated in thousandths of an inch per revolution.

As the stylus encounters the inclined surface on the template designated 32a, it is deflected to further increase the restriction at orifice 38 thus increasing the pressure in line 44 and in the rod end of cylinder 21. Cross slide 20 retracts and the stylus then travels the path along the line between C and D in FIG. 2. At this time oil is being discharged from both cylinders 18 and 21 through line 76 to metering pump 70. However, since the maximum amount of oil that can be displaced from the system by metering pump 70 per revolution of spindle 26 is fixed by the setting of the control means 74, the distance traveled by stylus 30 along the incline 32a and the corresponding travel of the cutting tool T per revolution of the workpiece W remains the same. In other words, the combined discharge from both cylinders is limited by the preselected displacement of metering pump 70. Flow control valve 104 is provided to limit the feed rate to a predetermined maximum value independently of metering pump 70.

When the stylus reaches the end of incline 32a, the restriction at orifice 38 is reduced to a point where the forces on opposite sides of piston 19 are equalized and the stylus then traverses the straight line extending between points D and E in FIG. 2. When the stylus reaches a point on template 34 corresponding to point E in FIG. 2 a switch 118 is actuated by slide 14 to de-energize solenoids 60, 54 and 88 and energize solenoid 62. Thus, the spools of valves 52 and 86 return to the positions shown in FIG. 1 and the spool of valve 58 shifts to the right to a position wherein pressure line 56 from pump 40 is connected to line 100 and conduit 66 is connected to sump at 64. The rod end of cylinder 18 is blocked at valve 52. Since pressure line 56 from pump 40 is connected to the head end of cylinder 21 only through the restricted flow control valve 79, pump 40 supplements pump 42 in returning the cross slide 20 to its retracted position. As the cross slide 20 retracts to the position shown in FIG. 1, stylus 30 travels the path indicated along the line extending from E to F in FIG. 2.

When the cross slide 20 reaches the fully retracted position a limit switch 120 is actuated to energize solenoid 54 and, thus, connect the rod end of cylinder 18 to sump 64. Since the end of cylinder 18 is pressurized by pump 40, slide 14 retracts to the right to the starting position shown in FIG. 1 where a switch 122 is actuated to de-energize solenoids 54 and 62 and place the entire circuit in the idling condition.

If during the feed cycle it is desired at any time to stop the feed of the tool it is only necessary to de-energize solenoid 88. When solenoid 88 is de-energized pressurized oil from high pressure pump 90 seats check valve 80 to prevent the flow of oil from the head ends of cylinders 18 and 21 to metering pump 70. However, since the spindle is still rotating, pump 70 merely recirculates the oil in conduits 78 and 82.

FIG. 3 shows the use of the metering pump 70 in a tracer control circuit employing a conventional 60° tracer unit. In a tracer of this type the main slide 140 is mounted on the base 142 of the machine tool and is adapted to be shifted longitudinally by a piston 144 of a hydraulic cylinder 146. The cross slide 148 on which the cutting tool T is supported is slideably mounted on slide 140 for movement along an axis inclined 60° to the path of travel of slide 140. (For purposes of illustration tool T is illustrated in FIG. 3 in relation to both cross slide 148 and work W.) Cross slide 148 is actuated by a piston 150 of a cylinder 152. The actuation of cylinder 152 is controlled by a servo valve 154 on the spool of which is mounted the stylus 156 engageable with template 158 fixedly mounted on the base 142 of the machine tool. Pressure fluid is supplied to cylinder 152 by servo valve 154 from a pump 160.

While the main slide 140 is shown actuated by a hydraulic cylinder 146, it will be appreciated that a hydraulic motor of the rotary type could be substituted for cylinder 146 and slide 140 connected thereto by a lead screw. In any event, the longitudinal feed of tool T across the work W in the direction of the arrow of FIG. 3 is determined by the rate at which hydraulic fluid is displaced from the head end of the cylinder 146. The rod end of cylinder 146 is connected by a conduit 162 with one port of a spring-centered, three-position, four-way solenoid valve 164. Valve 164 and pump 166 which supplies hydraulic fluid thereto correspond to valve 58 and pump 40 illustrated in FIG. 1 and further description thereof is, therefore, believed to be unnecessary.

As in the previous embodiment described, feed pump 70 is adapted to be supplied with high pressure oil through valve 86 from pump 90. The metering portion of the circuit illustrated in FIG. 3 is generally the same as that illustrated in FIG. 1. Port S of valve 86 is connected to drain through an adjustable flow control valve 168. The inlet side of pump 70 is connected to the head end of cylinder 146 by conduits 76, 78 and 170. The head end of cylinder 146 is also connected with one port of valve 164 by conduits 170 and 172 (a check valve 174 in conduit 172 preventing flow in a direction from cylinder 146 to valve 164).

As in the previous embodiment illustrated, pump 90 is capable of delivering oil at a pressure greater than developed by pump 166. In the normal feed cycle valve 164 is actuated so that pump 166 delivers oil under pressure to the rod end of cylinder 146 to shift piston 144 thereof in the feed direction, that is, toward the left as viewed in FIG. 3. Oil is thus discharged from the head end of cylinder 146 through conduits 170, 76 and 78 to the inlet side of metering pump 70. Since pump 70 is driven at a speed proportional to the speed of rotation of spindle 26, the amount of oil displaced from the head end of cylinder 146 during each revolution of the spindle is accurately metered by pump 70 through conduits 82, 84 and valve 86 to drain. When it is desired to stop feed of the tool, solenoid 88 of valve 86 is de-energized as illustrated in FIG. 3 so that oil under pressure from pump 90 is admitted to both sides of pump 70. At the same time the higher pressure oil from pump 90 seats valve 80 and prevents further discharge from cylinder 146. Pump 70 simply causes oil to recirculate through the closed circuit formed with conduits 78, 82, 96 and check valve 98.

In FIG. 4 there is illustrated one arrangement for adjusting the displacement of pump 70 in response to the change in a variable operating condition of the circuit. The hydraulic circuitry employed in conjunction with pump 70 may be that illustrated in FIG. 1 or in FIG. 3. In the particular arrangement illustrated in FIG. 4 the displacement adjustment of pump 70 is controlled by the current in motor 24. As in the previous embodiments illustrated, the speed of motor 24 is externally programmed. However, the motor current is continuously monitored by a sensor 180 and translated into a usable electric signal by a transducer 182. In the event motor 24 is a hydraulic motor then sensor 180 would sense the pressure drop across the motor. The output of transducer 182 is fed as one input (usually a current or a voltage) to a comparator 184. The other input to comparator 184 is derived from an adjustable device 186 which is set at a particular current or voltage corresponding to the desired load or torque on the motor. The output of the comparator 184, which corresponds to the difference between desired and actual loads and which may be of either sign (that is, load too high or too low) is amplified by a suitable amplifier 188 and controls in any suitable manner an actuator 190 having an operating element 192 connected to the adjustment control 74 of metering pump 70. If desired, an actuator position feed-back element 194 may be employed in the control circuit.

The arrangement illustrated in FIG. 4 is designed to vary the feed rate of the cutting tool to compensate for wear on the tool. The manually adjustable device 186 is set at a value corresponding to a maximum allowable torque which may be determined by permissible motor load, tool heating or other emperical condition. When the tool begins to wear, the torque on the motor tends to rise to a value above the setting of device 186. The excess torque is directed as a signal to actuator 190 which corresponding reduces the displacement of pump 70, thereby decreasing the axial feed of the tool. This has the effect of reducing the chip load on the tool and so decreasing the torque required of the motor until it reaches a value corresponding to the setting of device 186. In this manner maximum tool life is obtainable.

It will be appreciated that with respect to the arrangement illustrated in FIG. 4, suitable detection devices or alarms may be employed to indicate excesive tool wear. For example, a limit switch could be actuated when the adjustment control 174 of metering pump 70 is displaced to a position indicating a pre-selected minimum pump displacement and thereby warn the operator that the tool is worn excessively. In addition, a cycle timer could be employed for stopping the machine in the event the cycle time exceeded a pre-selected maximum interval.

It will be appreciated that with the control circuits described the amount of displacement of the tool in the feed direction is, at any given setting of pump 70, constant per revolution of the workpiece. If it is desired to produce a constant rate of metal removal on a workpiece of non-uniform diameter, then motor 24 may be hydrostatically or otherwise driven so that its speed varies with the diameter of the section of the workpiece being machined and the surface speed of the workpiece being machined will be constant. A constant surface speed of the workpiece and a constant feed of the cutting tool provides a combination which is ideal from the standpoint of producing maximum metal removal, best possible tool life, a minimum time cycle and the best possible quality of machined parts.

I claim:

1. In a lathe or the like means for rotatably supporting a workpiece to be machined, means for driving said support means, a tool-supporting slide, a hydraulic motor for actuating the slide to cause the tool to traverse a cutting path relative to the workpiece, means for directing hydraulic fluid under pressure to said hydraulic motor for actuating said slide, a metering pump operatively connected with said driving means for driving said pump at a speed proportional to the speed of rotation of the workpiece and means for directing the hydraulic fluid discharged from said hydraulic motor to said metering pump so that the distance traversed by said slide per revolution of the workpiece is determined by the amount of hydraulic fluid displaced by said pump per revolution of the workpiece.

2. The combination called for in claim 1 including means for varying the displacement of said pump to thereby adjust the feed rate of the slide to a desired value.

3. The combination called for in claim 1 wherein said hydraulic motor comprises a hydraulic cylinder.

4. The combination called for in claim 1 including means for varying the displacement of said pump in response to a change in a variable operating condition of the lathe from a preselected value to thereby vary the feed rate of the slide in accordance with variations in said operating condition.

5. The combination called for in claim 1 including means for varying the displacement of said pump in accordance with a change in the torque developed by said driving means from a preselected value.

6. The combination called for in claim 1 wherein said driving means are adapted to rotate said support at a speed which varies in accordance with the diameter of the section of the workpiece being machined so that the surface speed of workpiece at the portion engaged by the tool is substantially constant.

7. The combination called for in claim 1 wherein the value of an operating condition of the lathe is affected by the feed rate of said slide and means responsive to a change in said operating condition from a preselected value for varying the displacement of the pump to induce a corrective influence on the feed rate of the slide to maintain said operating condition at said preselected value.

8. In a lathe of the type comprising a rotating workpiece-supporting spindle, a main slide and a cross slide for movably supporting a cutting tool, the combination comprising a pair of hydraulic cylinders operably connected one with said main slide and the other with said cross slide, a hydraulic circuit for controlling the actuation of said cylinders, said hydraulic circuit including a tracer valve and a pattern controlled actuating means associated with the tracer valve for directing hydraulic fluid under pressure to said cylinders for causing the tool supported by the cross slide to traverse a predetermined cutting path relative to the workpiece, a metering pump operably connected with said spindle to rotate at a speed proportional to the speed of the spindle and means interconnecting said cylinders and said metering pump such that during the feed cycle all of the fluid discharged from said cylinders is directed to said metering pump so that during each revolution of the workpiece the combined fluid flow discharged from said cylinders is determined by the displacement of said pump.

9. The combination called for in claim 8 including means for varying the displacement of said pump to thereby enable selection of a desired feed rate for the tool.

10. The combination called for in claim 8 including means for rotating the work-supporting spindle at a constant speed.

11. The combination called for in claim 8 including means for rotating the work-supporting spindle at a speed which varies in relation to the diameter of the section of the workpiece being machined so that the surface speed of the workpiece at the portion engaged by the tool is constant.

12. The combination called for in claim 8 including means for varying the displacement of said pump in response to a change in a variable operating condition of the lathe from a preselected value to thereby vary the feed rate of the tool in accordance with variations in said operating condition.

13. The combination called for in claim 8 including means for rotating said spindle and means for varying the displacement of said pump in response to a change in the torque developed by said spindle rotating means from a preselected value.

14. The combination called for in claim 8 wherein said last-mentioned means includes a conduit common to both cylinders and connected to the inlet of said metering pump, a second conduit extending from the outlet of said metering pump and connected with said common conduit for uni-directional flow in the direction from said outlet to said inlet of the pump, valve means in said common conduit upstream from its connection with said outlet conduit for controlling flow in said common conduit and means for closing said last-mentioned valve means to block the flow of fluid from said cylinders to said pump and thereby arrest movement of the cutting tool.

15. The combination called for in claim 14 wherein said last-mentioned means includes a source of hydraulic fluid optionally connectable with said outlet conduit to recirculate fluid through said pump when the fluid flow from said cylinders to said pmp is blocked.

16. The combination called for in claim 8 wherein the value of a variable operating condition of the lathe is affected by the rate of feed of said tool and including means for varying the displacement of said pump in accordance with a change of said operating condition from a preselected value to thereby induce a corrective influence on the feed rate of the tool to maintain the said operating condition at said preselected value.

References Cited

UNITED STATES PATENTS

| | | | |
|---|---|---|---|
| 2,796,793 | 6/1957 | Addison et al. | 82—14 |
| 3,188,896 | 6/1965 | Le Lan | 82—14 |

GERALD A. DOST, Primary Examiner

U.S. Cl. X.R.

60—97; 91—411